(12) United States Patent
Nomura et al.

(10) Patent No.: US 11,174,778 B2
(45) Date of Patent: Nov. 16, 2021

(54) PRECOMBUSTION CHAMBER GAS ENGINE

(71) Applicant: MITSUBISHI HEAVY INDUSTRIES ENGINE & TURBOCHARGER, LTD., Sagamihara (JP)

(72) Inventors: Kazutoshi Nomura, Tokyo (JP); Shunya Sasaki, Tokyo (JP); Daisuke Takemoto, Tokyo (JP); Satoshi Yamada, Tokyo (JP); Akihiro Yuuki, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 0 days.

(21) Appl. No.: 16/466,618

(22) PCT Filed: Dec. 5, 2017

(86) PCT No.: PCT/JP2017/043705
§ 371 (c)(1),
(2) Date: Jun. 4, 2019

(87) PCT Pub. No.: WO2018/105627
PCT Pub. Date: Jun. 14, 2018

(65) Prior Publication Data
US 2019/0323416 A1    Oct. 24, 2019

(30) Foreign Application Priority Data
Dec. 8, 2016 (JP) .............................. JP2016-238752

(51) Int. Cl.
*F02B 19/12* (2006.01)
*F02B 19/18* (2006.01)
(Continued)

(52) U.S. Cl.
CPC .............. *F02B 19/12* (2013.01); *F02B 19/10* (2013.01); *F02B 19/1004* (2013.01);
(Continued)

(58) Field of Classification Search
CPC ...... F02B 19/12; F02B 19/18; F02B 19/1004; F02B 19/1014; F02B 19/1019;
(Continued)

(56) References Cited

U.S. PATENT DOCUMENTS

| | | | | |
|---|---|---|---|---|
| 3,220,389 A | * | 11/1965 | Van Rinsum | ........... F02B 23/04 123/268 |
| 4,416,228 A | * | 11/1983 | Benedikt | ............. F02B 19/1009 123/169 EL |

(Continued)

FOREIGN PATENT DOCUMENTS

| | | | | |
|---|---|---|---|---|
| EP | 2 700 796 A1 | | 2/2014 | |
| EP | 2700796 A1 | * | 2/2014 | .............. F02B 19/18 |

(Continued)

OTHER PUBLICATIONS

International Preliminary Report on Patentability and Written Opinion of the International Searching Authority, dated Jun. 20, 2019, for International Application No. PCT/JP2017/043705, with an English translation of the Written Opinion of the International Searching Authority.

(Continued)

*Primary Examiner* — John M Zaleskas
(74) *Attorney, Agent, or Firm* — Birch, Stewart, Kolasch & Birch, LLP

(57) ABSTRACT

A precombustion chamber gas engine includes a main-chamber forming portion forming a main combustion chamber, a precombustion-chamber forming portion forming a precombustion chamber communicating with the main combustion chamber via nozzle holes, and an ignition device (Continued)

disposed in the precombustion chamber and having an ignition portion spaced from the main chamber central axis at a predetermined distance. In a plan view, the precombustion chamber has a near-ignition region including the ignition portion and a far-ignition region opposite to the near-ignition region separated by a borderline passing through the precombustion chamber central axis and perpendicular to a straight line passing through the precombustion chamber central axis and the ignition portion. The cross-sectional area of a specific near nozzle hole which is at least one nozzle hole in the near-ignition region is smaller than the cross-sectional area of a specific far nozzle hole which is at least one nozzle hole in the far-ignition region.

11 Claims, 3 Drawing Sheets

(51) Int. Cl.
    *F02M 21/02* (2006.01)
    *F02B 19/16* (2006.01)
    *F02B 19/10* (2006.01)
(52) U.S. Cl.
    CPC ........ *F02B 19/108* (2013.01); *F02B 19/1014* (2013.01); *F02B 19/1019* (2013.01); *F02B 19/16* (2013.01); *F02B 19/18* (2013.01); *F02M 21/02* (2013.01); *F02M 21/0218* (2013.01); *F02M 21/0248* (2013.01); *F02M 21/0281* (2013.01); *Y02T 10/12* (2013.01); *Y02T 10/30* (2013.01)
(58) Field of Classification Search
    CPC ........ F02B 19/108; F02B 19/10; F02B 19/16; F02M 21/02; F02M 21/0218; F02M 21/0248; F02M 21/0281; Y02T 10/125; Y02T 10/32
    See application file for complete search history.

(56) References Cited

U.S. PATENT DOCUMENTS

| | | | | | |
|---|---|---|---|---|---|
| 4,646,695 | A | * | 3/1987 | Blackburn | F02B 19/12 123/256 |
| 5,024,193 | A | * | 6/1991 | Graze, Jr. | F02B 19/18 123/259 |
| 5,950,593 | A | * | 9/1999 | Matsuoka | F02B 19/02 123/292 |
| 6,016,785 | A | * | 1/2000 | Divecha | F02B 19/1004 123/254 |
| 6,019,081 | A | * | 2/2000 | Divecha | F02B 19/12 123/254 |
| 9,200,559 | B2 | | 12/2015 | Ishii et al. | |
| 10,077,708 | B2 | * | 9/2018 | Furukawa | F02B 19/12 |
| 2004/0261760 | A1 | * | 12/2004 | Robinet | F02B 19/18 123/266 |
| 2006/0096570 | A1 | * | 5/2006 | Tourteaux | F02B 19/12 123/266 |
| 2006/0096571 | A1 | * | 5/2006 | Tourteaux | F02B 17/005 123/266 |
| 2007/0089703 | A1 | * | 4/2007 | Shiraishi | F02B 19/16 123/260 |
| 2011/0146618 | A1 | * | 6/2011 | LaPointe | F02M 21/0209 123/266 |
| 2012/0103302 | A1 | * | 5/2012 | Attard | F02B 19/10 123/260 |
| 2013/0000598 | A1 | * | 1/2013 | Tokuoka | F02B 19/108 123/254 |
| 2013/0199483 | A1 | * | 8/2013 | Herden | F02B 19/12 123/143 B |
| 2014/0196686 | A1 | * | 7/2014 | Coldren | F02B 19/12 123/299 |
| 2014/0261296 | A1 | * | 9/2014 | Sotiropoulou | F02B 19/1014 123/260 |
| 2014/0261298 | A1 | * | 9/2014 | Sasidharan | F02B 19/1019 123/275 |
| 2015/0040845 | A1 | * | 2/2015 | Chiera | F02B 19/18 123/41.32 |
| 2015/0068489 | A1 | * | 3/2015 | Bunce | F02B 19/1057 123/262 |
| 2015/0184578 | A1 | * | 7/2015 | Oda | F02B 19/18 123/260 |
| 2016/0010538 | A1 | * | 1/2016 | Suzuki | F02B 19/1085 123/292 |
| 2016/0053673 | A1 | * | 2/2016 | Sotiropoulou | F02B 19/1014 123/260 |
| 2016/0230646 | A1 | * | 8/2016 | Kim | F02B 19/18 |
| 2016/0326946 | A1 | * | 11/2016 | Willi | F02B 19/08 |
| 2017/0138251 | A1 | * | 5/2017 | Watanabe | F02B 19/12 |
| 2017/0167359 | A1 | * | 6/2017 | Maier | F02B 19/18 |
| 2017/0226922 | A1 | * | 8/2017 | Tozzi | F02B 19/08 |
| 2018/0266307 | A1 | * | 9/2018 | Muto | F02B 19/08 |
| 2018/0334950 | A1 | * | 11/2018 | Yoshizumi | F02B 19/1014 |
| 2019/0048784 | A1 | * | 2/2019 | Ashizawa | F02B 19/1023 |
| 2019/0368410 | A1 | * | 12/2019 | Takemoto | F02B 19/16 |
| 2020/0080467 | A1 | * | 3/2020 | Nomura | F02B 19/1004 |

FOREIGN PATENT DOCUMENTS

| | | | | | |
|---|---|---|---|---|---|
| EP | 2 927 458 | A1 | | 10/2015 | |
| EP | 2927458 | A1 | * | 10/2015 | ............. F02B 19/12 |
| JP | 02153221 | A | * | 6/1990 | ............. F02B 19/18 |
| JP | 09112275 | A | * | 4/1997 | |
| JP | 2001-227344 | A | | 8/2001 | |
| JP | 2001227344 | A | * | 8/2001 | ............. F02B 19/12 |
| JP | 2001-263069 | A | | 9/2001 | |
| JP | 2001263069 | A | * | 9/2001 | |
| JP | 2007040174 | A | * | 2/2007 | |
| JP | 2009270538 | A | * | 11/2009 | |
| JP | 4975092 | B2 | | 7/2012 | |
| JP | 2014-62484 | A | | 4/2014 | |
| JP | 2016-3608 | A | | 1/2016 | |
| WO | WO-2012159756 | A1 | * | 11/2012 | ............. H01T 13/14 |

OTHER PUBLICATIONS

International Search Report dated Feb. 20, 2018, for International Application No. PCT/JP2017/043705, with an English translation.
Partial Supplementary European Search Report dated Oct. 21, 2019 issued in corresponding European Application No. 17879124.0.
Extended European Search Report effective Feb. 3, 2020 issued in the corresponding European Application No. 17879124.0.
Office Action dated Jun. 23, 2020 issued in counterpart Japanese Application No. 2016-238752.
Office Action dated Apr. 15, 2020 issued in the counterpart Japanese Application No. 2016-238752 with an English Translation.
Office Action dated Feb. 24, 2021 issued in counterpart European Application No. 17879124.0.

* cited by examiner

PRECOMBUSTION CHAMBER GAS ENGINE

TECHNICAL FIELD

The present disclosure relates to a precombustion chamber gas engine for combusting an air-fuel mixture in a main combustion chamber (main chamber) by injecting a combustion flame generated in a precombustion chamber (auxiliary chamber) via a plurality of nozzle holes to the main combustion chamber.

BACKGROUND ART

A precombustion chamber gas engine is conventionally known as an engine enabling efficient combustion of a lean premixed gas (for instance, Patent Documents 1 and 2). The precombustion chamber gas engine includes a main combustion chamber (main chamber) defined between a piston and a cylinder head and a precombustion chamber disposed adjacent to the main combustion chamber, for instance above the cylinder. The main combustion chamber communicates with the precombustion chamber via a plurality of nozzle holes. By igniting an air-fuel mixture in the precombustion chamber by an ignition device such as an ignition plug, a combustion flame is generated and jetted via each of the nozzle holes disposed at a lower portion of the precombustion chamber, by which a lean premixed gas in the main combustion chamber is combusted. More specifically, a part of a lean premixed gas introduced into the cylinder during the intake stroke of the engine flows into the precombustion chamber via each of the nozzle holes during the compression stroke and is mixed with a precombustion chamber fuel supplied to the precombustion chamber to produce an air-fuel mixture having a concentration suitable for ignition in the precombustion chamber. The air-fuel mixture in this state is ignited by the ignition device, and the combustion flame thereof is injected from the precombustion chamber to the cylinder and serves as a torch to ignite and combust the lean premixed gas in the main combustion chamber. This allows combustion of the lean fuel in the main combustion chamber, thus enabling low fuel consumption. Further, since combustion of the lean mixed gas in the main combustion chamber is performed at a relatively low temperature, generation of $NO_X$ is reduced, and low pollution can be achieved.

In such a precombustion chamber gas engine, if the flow of mixed gas from the main chamber to the precombustion chamber via the nozzle holes becomes unstable, an air-fuel mixture having a concentration suitable for ignition is less likely to be formed around an ignition portion of the ignition device (e.g., electrode of ignition plug), which may cause unstable combustion in the precombustion chamber. To solve the above problem, on the basis of findings that the shape of the nozzle hole affects the stability of the flow of mixed gas to be introduced into the precombustion chamber, Patent Document 1 defines the shape of a throat (small-diameter cylinder chamber described later) of the precombustion chamber and the shape of a round-chamfered portion along a rim of a throat-side opening end of the nozzle hole to suppress combustion fluctuation.

Further, as described above, since the air-fuel mixture in the main combustion chamber is ignited by the combustion flame (torch jet) injected from the precombustion chamber to the main combustion chamber via each of the nozzle holes at the combustion stroke, variation of flame propagation of combustion flame of the air-fuel mixture in the main combustion chamber may cause abnormal combustion such as knocking. To solve the above problem, on the basis of findings that the variation of flame propagation speed in the main combustion chamber is caused when the temperature of a cylinder wall surface in an intake region where an intake port is located is lower than the temperature of a cylinder wall surface in an exhaust region where an exhaust port is located, Patent Document 2 discloses that the sum of nozzle hole areas of intake-side nozzle holes disposed in the intake region is made larger than the sum of nozzle hole areas of exhaust-side nozzle holes disposed in the exhaust region. This intends to shorten the time for the flame of an intake-side air-fuel mixture ignited by the torch jet from the intake-side nozzle holes to reach the cylinder wall surface, in order to suppress the occurrence of knocking.

CITATION LIST

Patent Literature

Patent Document 1: JP2016-3608A
Patent Document 2: JP2014-62484A

SUMMARY

Problems to be Solved

An ignition device (ignition portion) of the precombustion chamber is occasionally difficult to be disposed on the central axis of a cylinder for structural reasons of the precombustion chamber, and thus is disposed away from the central axis of the cylinder in some cases (see FIG. 1 described later). In such cases, the present inventors have found that, in the precombustion chamber, flame propagation of the combustion flame on the side adjacent to the ignition device is relatively faster than flame propagation on the opposite side away from the ignition device. Generally, nozzle holes of the precombustion chamber are formed at an equal interval in a plan view, and more unburned gas tends to leak from the precombustion chamber to the main combustion chamber via a nozzle hole which the combustion flame have reached more behind. Consequently, injection start timing and injection strength of the torch jet vary between the nozzle holes, and ignition timing of a lean premixed gas in the main combustion chamber ignited by the torch get from each of the nozzle holes and flame propagation (e.g., flame propagation speed) of the combustion flame also vary accordingly. The variation of flame propagation in the main combustion chamber causes unburned gas to remain in a region where flame propagation of the combustion flame delays, which may cause knocking and degrade thermal efficiency and output power of a gas engine.

In view of the above, an object of at least one embodiment of the present invention is to provide a precombustion chamber gas engine capable of controlling the variation of flame propagation in a main combustion chamber.

Solution to the Problems (1) According to at least one embodiment of the present invention, a precombustion chamber gas engine comprises: a main-chamber forming portion forming a main combustion chamber; a precombustion-chamber forming portion forming a precombustion chamber communicating with the main combustion chamber via a plurality of nozzle holes; and an ignition device disposed in the precombustion chamber and having an ignition portion spaced from a main chamber central axis of the main combustion chamber at a predetermined distance. In a plan view, the precombustion chamber has a near-ignition region in which the ignition portion is disposed and a far-ignition region opposite to the near-ignition region separated by a borderline passing through a precombustion chamber central axis of the precombustion chamber and perpendicular to a straight line passing through the precombustion chamber central axis and the ignition portion. The plurality of nozzle holes includes a specific near nozzle hole which is at least one nozzle hole in the near-ignition region and a specific far nozzle hole which is at least one nozzle hole in the far-ignition region, and a cross-sectional area of the specific near nozzle hole is smaller than a cross-sectional area of the specific far nozzle hole.

With the above configuration (1), in a plan view of the precombustion chamber of the precombustion chamber gas engine in which the ignition portion of the ignition device (e.g., electrode of ignition plug) is spaced from the central axis of the main combustion chamber (main chamber central axis) at a predetermined distance, the cross-sectional area of the specific near nozzle hole disposed in a region (near-ignition region) relatively close to the ignition portion in a plan view of the precombustion chamber is smaller than the cross-sectional area of the specific far nozzle hole disposed in a region (far-ignition region) relatively away from the ignition portion. Here, as the cross-sectional area of the nozzle hole increases, the pressure loss upon passage through the nozzle hole decreases, the combustion flame easily passes, and the injection distance at injection increases. Thus, by increasing the cross-sectional area of the nozzle hole, it is possible to advance the injection start timing of the combustion flame (torch jet) injected to the main combustion chamber from the opening end of the nozzle hole on the main combustion chamber side (main-chamber-side opening end), and further it is possible to increase injection strength (penetration force) at injection.

Accordingly, in the precombustion chamber, by setting the cross-sectional area of the specific near nozzle hole which the combustion flame produced by ignition of an air-fuel mixture by the ignition device reaches earlier to be smaller than the cross-sectional area of the specific far nozzle hole which the combustion flame reaches later, it is possible to adjust and equalize injection start timing and injection strength of torch jets injected to the main combustion chamber from the respective main-chamber-side opening ends of the specific near nozzle hole and the specific far nozzle hole, and it is possible to suppress the variation of flame propagation in the main combustion chamber. Further, by suppressing the variation of flame propagation in the main combustion chamber, it is possible to suppress knocking caused by delay of flame arrival, and it is possible to improve the engine efficiency.

(2) In some embodiments, in the above configuration (1), the specific near nozzle hole is a nearest nozzle hole closest to the ignition portion among the plurality of nozzle holes in the near-ignition region in a plan view, and the specific far nozzle hole is a farthest nozzle hole farthest from the ignition portion among the plurality of nozzle holes in the far-ignition region in a plan view.

With the above configuration (2), in a plan view of the precombustion chamber, the cross-sectional area of the nozzle hole (nearest nozzle hole) closest to the ignition portion is smaller than the cross-sectional area of the nozzle hole (farthest nozzle hole) farthest from the ignition portion. Thereby, in the precombustion chamber, it is possible to adjust and equalize injection start timing of torch jet of each of the nearest nozzle hole which the combustion flame produced by ignition of an air-fuel mixture by the ignition device reaches the earliest and the farthest nozzle hole which the combustion flame reaches the latest, and it is possible to suppress the variation of injection start timing of torch jet injected to the main combustion chamber from each of the nozzle holes. Thereby, it is possible to efficiently suppress the variation of flame propagation in the main combustion chamber.

(3) In some embodiments, in the above configuration (1) or (2), the cross-sectional area of the specific near nozzle hole is smaller than an average of cross-sectional areas of all of the plurality of nozzle holes.

With the above configuration (3), by making the cross-sectional area of the specific near nozzle hole smaller than the average, the cross-sectional area of the specific near nozzle hole is made smaller than the cross-sectional area of the specific far nozzle hole.

(4) In some embodiments, in the above configuration (1) or (2), the cross-sectional area of the specific far nozzle hole is larger than an average of cross-sectional areas of all of the plurality of nozzle holes.

With the above configuration (4), by making the cross-sectional area of the specific far nozzle hole larger than the average, the cross-sectional area of the specific near nozzle hole is made smaller than the cross-sectional area of the specific far nozzle hole.

(5) According to at least one embodiment of the present invention, a precombustion chamber gas engine comprises: a main-chamber forming portion forming a main combustion chamber; a precombustion-chamber forming portion forming a precombustion chamber communicating with the main combustion chamber via a plurality of nozzle holes; and an ignition device disposed in the precombustion chamber and having an ignition portion spaced from a main chamber central axis of the main combustion chamber at a predetermined distance. In a plan view, the precombustion chamber has a near-ignition region in which the ignition portion is disposed and a far-ignition region opposite to the near-ignition region separated by a borderline passing through a precombustion chamber central axis of the precombustion chamber and perpendicular to a straight line passing through the precombustion chamber central axis and the ignition portion. The plurality of nozzle holes includes a specific near nozzle hole which is at least one nozzle hole in the near-ignition region and a specific far nozzle hole which is at least one nozzle hole in the far-ignition region, and an angle of depression of the specific near nozzle hole is larger than an angle of depression of the specific far nozzle hole.

With the above configuration (5), in a plan view of the precombustion chamber of the precombustion chamber gas engine in which the ignition portion of the ignition device (e.g., electrode of ignition plug) is spaced from the central axis of the main combustion chamber (main chamber central axis) at a predetermined distance, the angle of depression of the specific near nozzle hole disposed in a region (near-ignition region) relatively close to the ignition portion is larger than the angle of the specific far nozzle hole disposed in a region (far-ignition region) relatively away from the ignition portion. Here, with respect to the angle of depression between the central line of the nozzle hole and a line (e.g., horizontal line) perpendicular to the central axis of the main combustion chamber, as the angle of depression of the nozzle hole increases, the flame propagation distance of the combustion flame from the main-chamber-side opening end of the nozzle hole to the cylinder wall surface increases, and it takes longer time for flame propagation to the cylinder wall surface. It takes time for flame to propagate from the opening end of the nozzle hole on the main combustion chamber side (main-chamber-side opening end) to the cylinder wall surface. Therefore, in the precombustion chamber, by setting the angle of depression of the specific near nozzle hole which the combustion flame produced by ignition of an air-fuel mixture reaches earlier to be larger than the angle of depression of the specific far nozzle hole which the combustion flame reaches later, it is possible to adjust and equalize the timing of arrival of the combustion flame to the cylinder wall surface, and it is possible to suppress the variation of flame propagation in the main combustion chamber. Further, by suppressing the variation of flame propagation in the main combustion chamber, it is possible to suppress knocking caused by delay of arrival of the combustion flame, and it is possible to improve the efficiency of the precombustion chamber gas engine 1.

(6) In some embodiments, in the above configuration (5), the specific near nozzle hole is a nearest nozzle hole closest to the ignition portion among the plurality of nozzle holes in the near-ignition region in a plan view, and the specific far nozzle hole is a farthest nozzle hole farthest from the ignition portion among the plurality of nozzle holes in the far-ignition region in a plan view.

With the above configuration (6), in a plan view of the precombustion chamber, the angle of depression of the nozzle hole (nearest nozzle hole) closest to the ignition portion is larger than the angle of depression of the nozzle hole (farthest nozzle hole) farthest from the ignition portion. Thereby, in the precombustion chamber, it is possible to adjust and equalize the timing of arrival of the combustion flame to the cylinder wall surface from each of the nearest nozzle hole which the combustion flame produced by ignition of an air-fuel mixture by the ignition device reaches the earliest and the farthest nozzle hole which the combustion flame reaches the latest, and it is possible to efficiently suppress the variation of flame propagation in the main combustion chamber.

(7) In some embodiments, in the above configuration (5) or (6), the angle of depression of the specific near nozzle hole is larger than an average of angles of depression of all of the plurality of nozzle holes.

With the above configuration (7), by making the angle of depression of the specific near nozzle hole larger than the average, the angle of depression of the specific near nozzle hole is made larger than the angle of depression of the specific far nozzle hole.

(8) In some embodiments, in the above configuration (5) or (6), the angle of depression of the specific far nozzle hole is smaller than an average of angles of depression of all of the plurality of nozzle holes.

With the above configuration (8), by making the angle of depression of the specific far nozzle hole smaller than the average, the angle of depression of the specific near nozzle hole is made larger than the angle of depression of the specific far nozzle hole.

(9) In some embodiments, in any one of the above configurations (1) to (8), the main chamber central axis of the main combustion chamber coincides with the precombustion chamber central axis.

With the above configuration (9), in the precombustion chamber gas engine in which the precombustion chamber is provided so that the main chamber central axis of the main combustion chamber coincides with the precombustion chamber central axis of the precombustion chamber, and the ignition portion of the ignition device is spaced from the central axis of the main combustion chamber (main chamber central axis) at a predetermined distance, it is possible to suppress the variation of flame propagation in the main combustion chamber.

(10) In some embodiments, in the above configuration (9), the precombustion chamber includes: a cylindrical small-diameter-cylinder forming portion forming a small-diameter cylinder chamber having a predetermined inner diameter and connected to the plurality of nozzle holes; and a cylindrical large-diameter-cylinder forming portion forming a large-diameter cylinder chamber which has an inner diameter larger than that of the small-diameter cylinder chamber and in which the ignition portion of the ignition device is disposed, and the main chamber central axis coincides with a precombustion chamber central axis of the small-diameter cylinder chamber.

With the above configuration (10), in the precombustion chamber gas engine in which the precombustion chamber is provided so that the main chamber central axis of the main combustion chamber coincides with the precombustion chamber central axis of the small-diameter cylinder chamber of the precombustion chamber, and the ignition portion of the ignition device is spaced from the central axis of the main combustion chamber (main chamber central axis) at a predetermined distance, it is possible to suppress the variation of flame propagation in the main combustion chamber.

(11) In some embodiments, in the above configuration (10), the predetermined distance is larger than 10% of a maximum value of an inner diameter of the large-diameter cylinder chamber.

With the above configuration (11), in the precombustion chamber gas engine in which the ignition portion of the ignition device is spaced from the central axis of the main combustion chamber (main chamber central axis) at the predetermined distance, it is possible to suppress the variation of flame propagation in the main combustion chamber.

Advantageous Effects

According to at least one embodiment of the present invention, there is provided a precombustion chamber gas engine capable of controlling the variation of flame propagation in a main combustion chamber.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
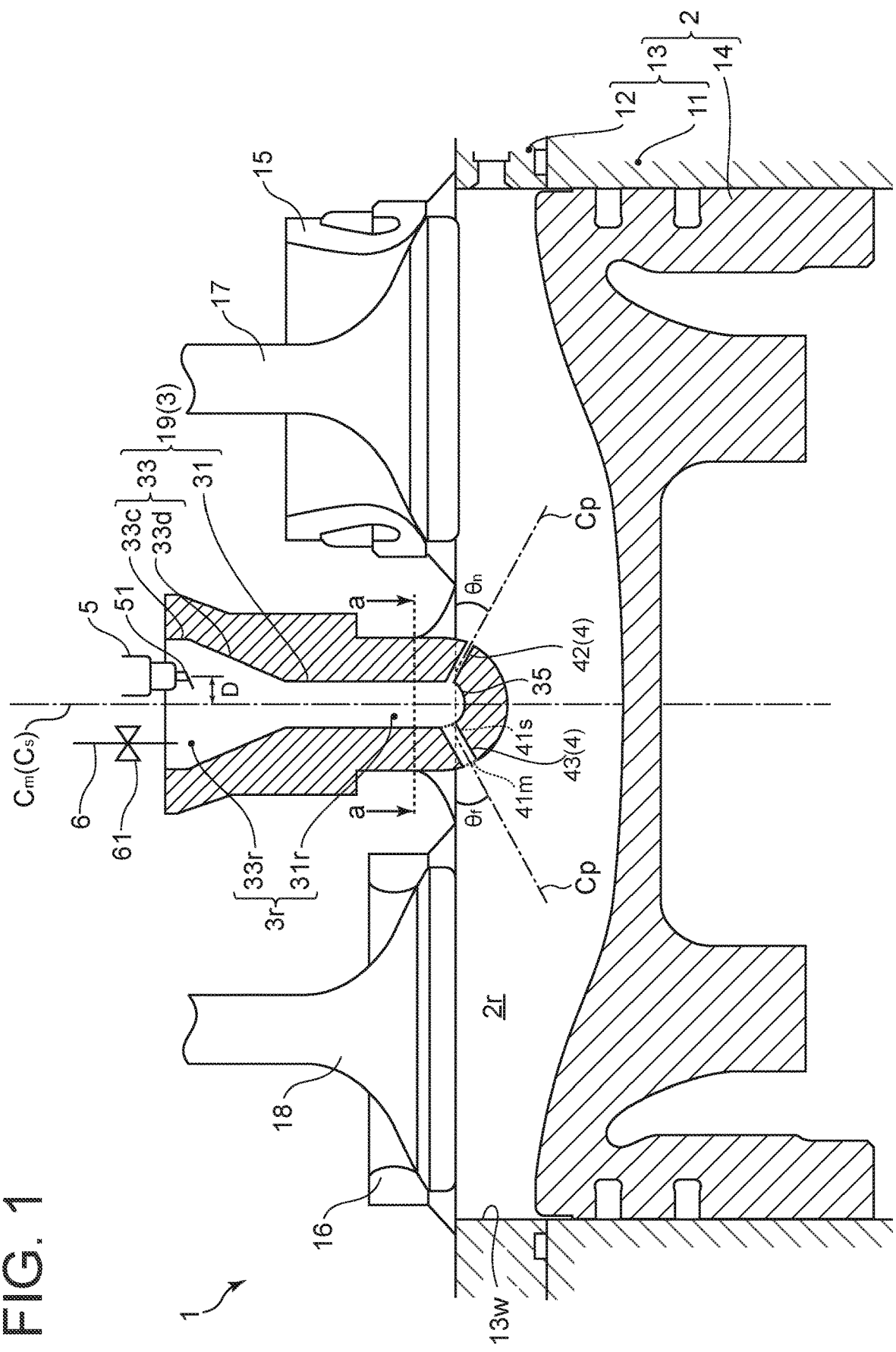
FIG. 1 is a schematic cross-sectional view of a precombustion chamber gas engine according to an embodiment of the present invention, where the cross-sectional area of a specific near nozzle hole is smaller than a cross-sectional area of a specific far nozzle hole.
Figure 2A:
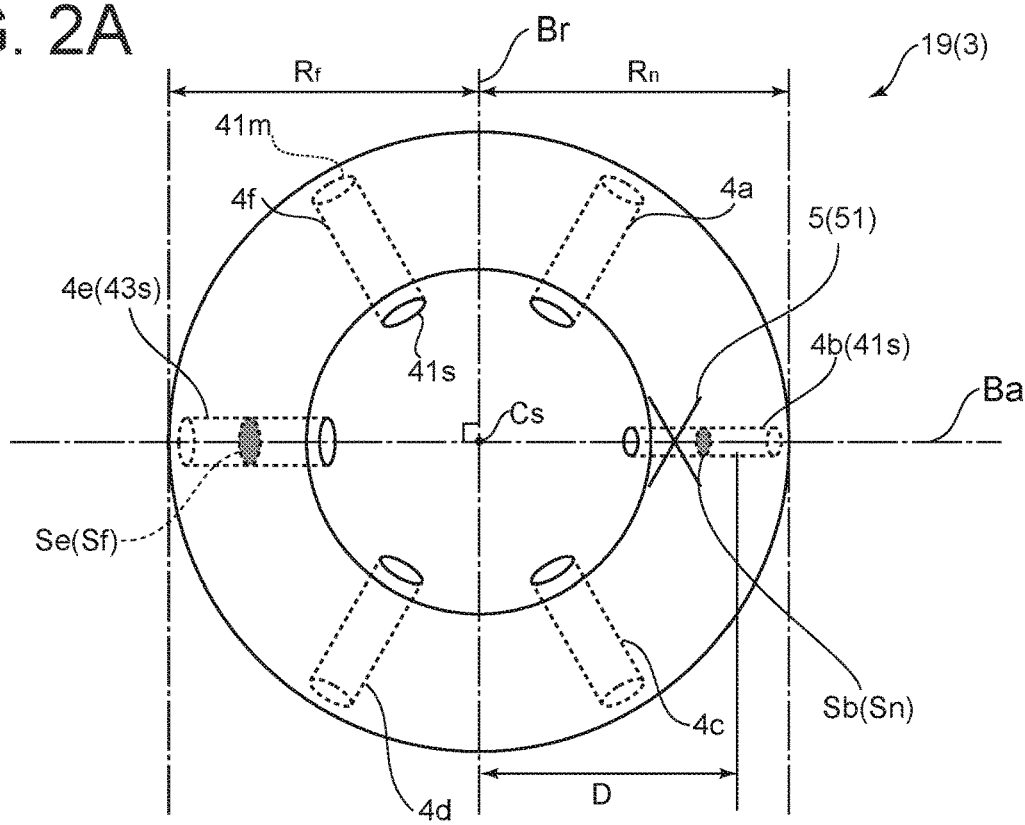
FIG. 2A is a schematic cross-sectional view of a precombustion chamber gas engine taken along line aa in FIG. 1 and shows a cross-section of a precombustion-chamber forming portion according to an embodiment of the present invention.
Figure 2B:
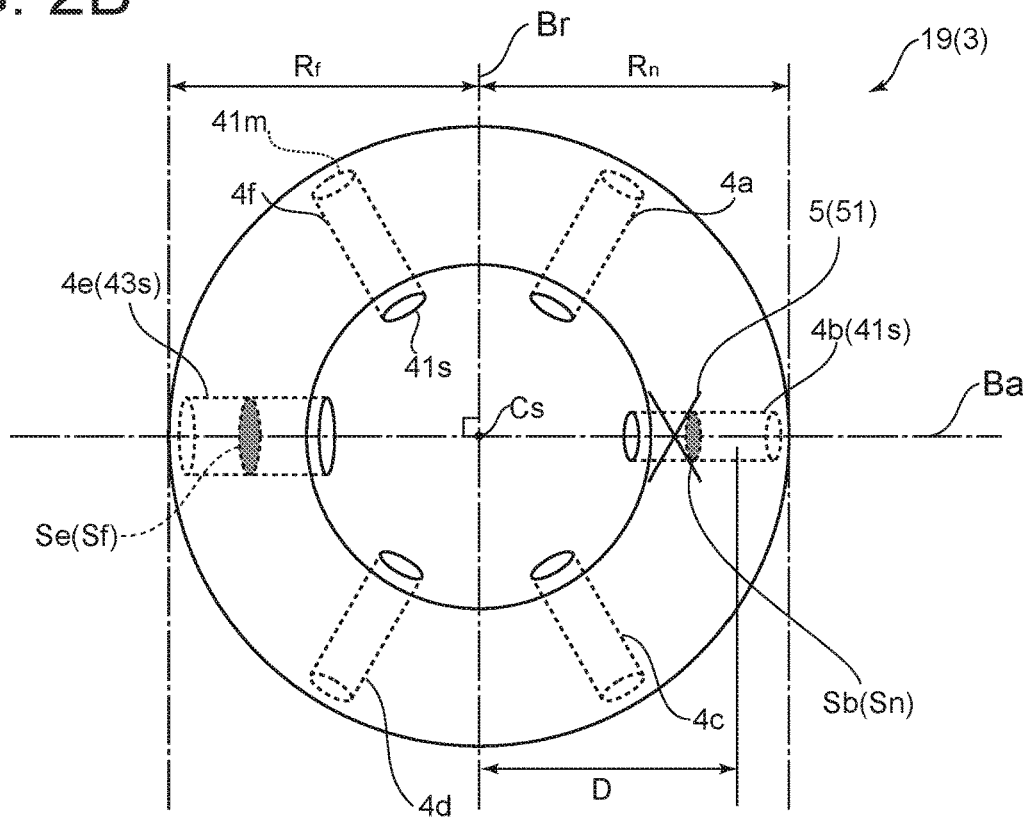
FIG. 2B is a schematic cross-sectional view of a precombustion chamber gas engine taken along line aa in FIG. 1 and shows a cross-section of a precombustion-chamber forming portion according to another embodiment of the present invention.
Figure 3:
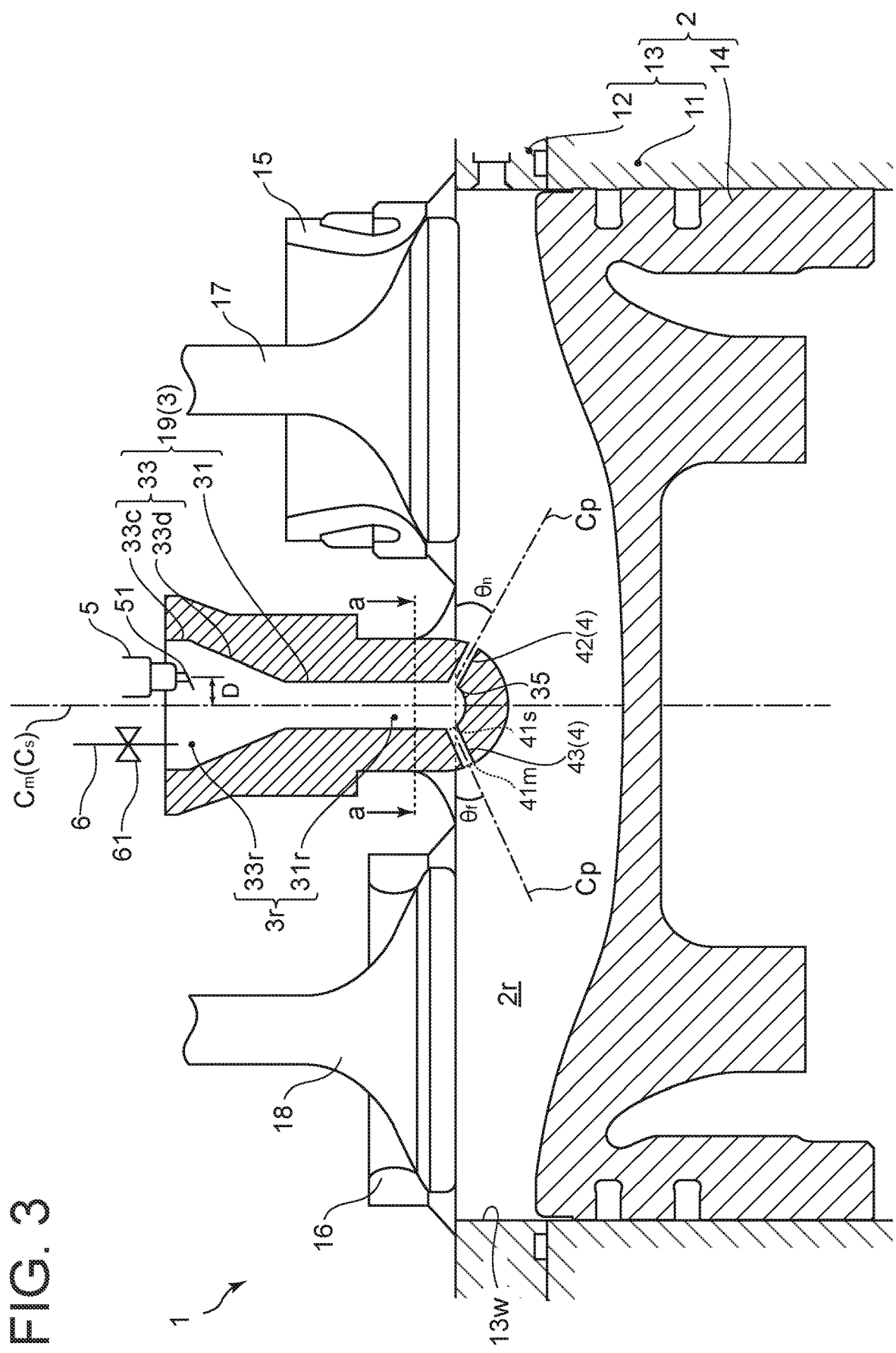
FIG. 3 is a schematic cross-sectional view of a precombustion chamber gas engine according to another embodiment of the present invention, where the angle of depression of a specific near nozzle hole is larger than the angle of depression of a specific far nozzle hole.

FIG. 1 is a schematic cross-sectional view of a precombustion chamber gas engine 1 according to an embodiment of the present invention. FIG. 2A is a schematic cross-sectional view of a precombustion chamber gas engine 1 taken along line aa in FIG. 1 and shows a cross-section of a precombustion-chamber forming portion 3 according to an embodiment of the present invention. FIG. 2B is a schematic cross-sectional view of a precombustion chamber gas engine 1 taken along line aa in FIG. 1 and shows a cross-section of a precombustion-chamber forming portion 3 according to another embodiment of the present invention. FIG. 3 is a schematic cross-sectional view of a precombustion chamber gas engine 1 according to another embodiment of the present invention, where the angle of depression of a specific near nozzle hole 42 is larger than the angle of depression of a specific far nozzle hole 43.

As shown in FIGS. 1 to 3, the precombustion chamber gas engine 1 includes a main-chamber forming portion 2 forming a main combustion chamber 2r, a precombustion-chamber forming portion 3 forming a precombustion chamber 3r, and an ignition device 5 disposed in the precombustion chamber 3r.

More specifically, in the embodiments shown in FIGS. 1 to 3, as shown in FIGS. 1 and 3, the precombustion chamber gas engine 1 includes: a cylinder 13 including a cylinder liner 11 having therein a cylinder structure of cylindrical shape and a cylinder head 12 having therein a recessed structure capable of capping the top of the cylinder structure; a piston 14 reciprocably disposed in the cylinder 13; an intake port 15 and an exhaust port 16 connected around the cylinder head 12; an intake valve 17 for opening and closing the intake port 15; an exhaust valve 18 for opening and closing the exhaust port 16; and a precombustion chamber cap 19. A main combustion chamber 2r (main chamber) is defined between the cylinder 13 and the piston 14. A precombustion chamber 3r is formed by the precombustion chamber cap 19 disposed on the cylinder head 12 so as to be positioned above the main combustion chamber 2r (opposite to the piston 14). That is, in the embodiments shown in FIGS. 1 to 3, the cylinder 13 and the piston 14 form the main-chamber forming portion 2 and the precombustion chamber cap 19 forms the precombustion-chamber forming portion 3. Additionally, the precombustion chamber gas engine 1 further includes a precombustion-chamber-gas supply device 6 for supplying a precombustion chamber fuel gas to the precombustion chamber 3r not via the main combustion chamber 2r, and the supply of the precombustion chamber fuel gas to the precombustion chamber 3r is controlled by a precombustion-chamber-fuel-gas supply valve 61 (see FIGS. 1 and 3).

Further, the ignition device 5 has an ignition portion 51 capable of igniting an air-fuel mixture, and is disposed on an engine so that the ignition portion 51 is spaced from the central axis of the main combustion chamber 2r (hereinafter, main chamber central axis Cm) at a predetermined distance D. For instance, the ignition device 5 may be an ignition plug of a spark ignition type. In this case, the ignition portion 51 is a portion including an electrode which generates a spark. The predetermined distance D may be larger than 10% of a maximum value of the inner diameter of the main combustion chamber 2r. As described later, in a case where the precombustion chamber 3r includes a small-diameter cylinder chamber 31r and a large-diameter cylinder chamber 33r, the ignition portion 51 may be disposed in the large-diameter cylinder chamber 33r (constant diameter cylinder portion 33c), and the predetermined distance D may be a maximum value of the inner diameter of the large-diameter cylinder chamber 33r.

On the other hand, the precombustion-chamber forming portion 3 includes a plurality of nozzle holes 4 connecting the precombustion chamber 3r formed in the precombustion-chamber forming portion 3 to the outside. The main combustion chamber 2r communicates with the precombustion chamber 3r via the plurality of nozzle holes 4. More specifically, each of the nozzle holes 4 has a main-chamber-side opening end 41m connected to the main combustion chamber 2r on one side and a precombustion-chamber-side opening end 41s connected to the precombustion chamber 3r on the other side. The precombustion-chamber-side opening end 41s may be connected to the precombustion chamber 3r above a bottom portion 35 including a portion furthest from the top portion where the ignition portion 51 is disposed (see FIGS. 1 and 3). Further, as shown in FIGS. 2A and 2B, the plurality of nozzle holes 4 are arranged around the central axis of the precombustion chamber 3r (hereinafter, precombustion chamber central axis Cs) at an equal interval, and each of the nozzle holes 4 is formed so as to penetrate the precombustion-chamber forming portion 3 linearly along the radial direction of the precombustion chamber central axis Cs, in a plan view. For instance, the cross-sectional shape (shape in plan view) of the precombustion-chamber forming portion 3 (precombustion chamber cap 19) having the precombustion chamber central axis Cs as a normal is circular. In a case where the precombustion-chamber forming portion 3 has, for instance, six linear nozzle holes 4, the nozzle holes 4 are disposed along the radial direction and arranged at an equal interval of 60° around the precombustion chamber central axis Cs (see FIGS. 2A and 2B). Further, each of the nozzle holes 4 extends linearly at a predetermined angle θ of depression (described later) (see FIGS. 1 and 3).

In the embodiments shown in FIGS. 1 to 3, the precombustion chamber 3r includes a small-diameter-cylinder forming portion 31 forming a small-diameter cylinder chamber 31r having a predetermined inner diameter and connected to the plurality of nozzle holes 4 and a large-diameter-cylinder forming portion 33 forming a large-diameter cylinder chamber 33r which has an inner diameter larger than that of the small-diameter cylinder chamber 31r and in which the ignition portion 51 of the ignition device 5 is disposed. In other words, the precombustion-chamber forming portion 3 (precombustion chamber cap 19) includes a small-diameter-cylinder forming portion 31 and a large-diameter-cylinder forming portion 33. Further, the large-diameter-cylinder forming portion 33 includes a cylindrical enlarged diameter cylinder portion 33d connected to the small-diameter cylinder chamber 31r and having an inner diameter increasing with a distance from the small-diameter cylinder chamber 31r and a cylindrical constant diameter cylinder portion 33c connected to the enlarged diameter cylinder portion 33d and having an inner diameter equal to the maximum diameter of the enlarged diameter cylinder portion 33d. Further, the precombustion chamber central axis Cs coincides with the central axis of the small-diameter cylinder chamber 31r.

However, the present invention is not limited to the present embodiments. In some embodiments, the precombustion chamber 3r may have other shape, for instance, a cylindrical shape having a constant inner diameter.

Further, although in the embodiment shown in FIGS. 1 to 3, the main chamber central axis Cm coincides with the precombustion chamber central axis Cs, the present invention is not limited thereto. In some embodiments, the main chamber central axis Cm may not coincide with the precombustion chamber central axis Cs, for instance, the precombustion chamber central axis Cs may be oblique to the main chamber central axis Cm. Further, the central axis of the small-diameter cylinder chamber 31r may not coincide with the central axis of the large-diameter cylinder chamber 33r.

The precombustion chamber gas engine 1 having the above configuration opens the intake valve 17 and closes the exhaust valve 18 when the piston 14 moves downward at the intake stroke, for instance. As the intake valve 17 opens, a lean premixed gas containing a mixture of a fuel gas and air is introduced into the cylinder 13 through the intake port 15 connected to the intake valve 17. As the precombustion-chamber-fuel-gas supply valve 61 opens, a precombustion chamber fuel gas is introduced into the precombustion chamber 3r. Furthermore, at the compression stroke, the precombustion-chamber-fuel-gas supply valve 61 closes when the piston 14 moves upward. Further, the lean premixed gas introduced into the cylinder 13 through the intake port 15 is compressed as the piston 14 moves upward, and a part of the lean premixed gas is introduced into the precombustion chamber 3r through each of the nozzle holes 4 of the precombustion chamber 3r. The lean premixed gas introduced from the main combustion chamber 2r to the precombustion chamber 3r is mixed with the precombustion chamber fuel gas to produce an air-fuel mixture having a concentration suitable for ignition in the precombustion chamber 3r. The air-fuel mixture in the precombustion chamber 3r is ignited by the ignition device 5 at a predetermined timing when the piston 14 arrives at the vicinity of the compression top dead center, and the air-fuel mixture in the precombustion chamber 3r is thus combusted. A combustion flame caused by this combustion is injected into the cylinder 13 through each of the nozzle holes and ignites the lean premixed gas in the cylinder 13, which leads to combustion of the lean premixed gas in the main combustion chamber 2r.

At this time, the present inventors have found through numerical analysis and the like that in the precombustion chamber gas engine 1 according to the present invention, since the ignition portion 51 of the ignition device 5 is spaced from the main chamber central axis Cm at a predetermined distance D, the timing at which the combustion flame produced by ignition of the air-fuel mixture in the precombustion chamber 3r by the ignition portion 51 reaches each of the nozzle holes 4 varies. Further, they found that, if the timing of arrival of the combustion flame varies among the nozzle holes 4 and if, for instance, the nozzle holes 4 have the same shape, variation occurs in injection start timing at which combustion flame (hereinafter, referred to as torch jet as appropriate) is injected to the main combustion chamber 2r from each of the nozzle holes 4 through a corresponding main-chamber-side opening end 41m and in injection strength thereof. If injection start timing and injection strength of torch jet from each of the nozzle holes 4 vary, flame propagation in the main combustion chamber 2r also varies. The variation of flame propagation in the main combustion chamber 2r causes unburned gas to remain in a region where flame propagation delays, which may cause knocking and degrade thermal efficiency and output power of the precombustion chamber gas engine 1.

In view of this, the present inventors have arrived at suppressing the variation of flame propagation in the main combustion chamber 2r by changing the shape of at least one nozzle hole 4 of the plurality of nozzle holes 4 so as to suppress the variation of injection start timing and injection strength of torch jet injected to the main combustion chamber 2r from each of the nozzle holes 4.

The shape of the plurality of nozzle holes 4 in some embodiments of the present invention will now be described.

In the present invention, in a plan view as shown in FIGS. 2A and 2B, the precombustion chamber 3r has a near-ignition region Rn in which the ignition portion 51 is disposed and a far-ignition region Rf opposite to the near-ignition region Rn separated by a borderline Br passing through the precombustion chamber central axis Cs of the precombustion chamber 3r and perpendicular to a straight line (reference line Ba) passing through the precombustion chamber central axis Cs and the ignition portion 51. In other words, in a plan view, the precombustion chamber 3r is divided by the borderline Br into two regions of a near-ignition region Rn relatively close to the ignition portion 51 and a far-ignition region Rf relatively far from the ignition portion 51 having the same size.

First, embodiments relating to cross-sectional area S of the nozzle hole 4 will be described with reference to FIGS. 1 to 2B.

In some embodiments, as shown in FIGS. 1 to 2B, a cross-sectional area Sn of the specific near nozzle hole 42 which is at least one nozzle hole 4 in the near-ignition region Rn is smaller than a cross-sectional area Sf of the specific far nozzle hole 43 which is at least one nozzle hole 4 in the far-ignition region Rf. Here, as the cross-sectional area S of the nozzle hole 4 increases, the pressure loss upon passage through the nozzle hole 4 decreases, the combustion flame easily passes, and the injection distance at injection increases. Thus, by increasing the cross-sectional area S of the nozzle hole 4, it is possible to advance the injection start timing of the torch jet injected from the main-chamber-side opening end 41m of the nozzle hole 4, and further it is possible to increase injection strength (penetration force) at injection. Conversely, by decreasing the cross-sectional area S of the nozzle hole 4, it is possible to delay the injection start timing of the torch jet injected from the main-chamberside opening end 41m of the nozzle hole 4, and further it is possible to decrease injection strength (penetration force) at injection.

Accordingly, in the precombustion chamber 3r, by setting the cross-sectional area Sn of the specific near nozzle hole 42 which the combustion flame produced by ignition of an air-fuel mixture by the ignition device 5 reaches earlier to be smaller than the cross-sectional area Sf of the specific far nozzle hole 43 which the combustion flame reaches later, it is possible to adjust and equalize injection start timing and injection strength of torch jets injected to the main combustion chamber 2r through the respective main-chamber-side opening ends 41m of the specific near nozzle hole 42 and the specific far nozzle hole 43, and it is possible to suppress the variation of flame propagation in the main combustion chamber 2r. Further, by suppressing the variation of flame propagation in the main combustion chamber 2r, it is possible to suppress knocking caused by delay of flame arrival, and it is possible to improve the engine efficiency.

More specifically, in some embodiments, as shown in FIGS. 2A and 2B, the specific near nozzle hole 42 may be a nearest nozzle hole 42s which is a nozzle hole 4 closest to the ignition portion 51 in the near-ignition region Rn in a plan view; and the specific far nozzle hole 43 may be a farthest nozzle hole 43s which is a nozzle hole 4 farthest from the ignition portion 51 in the far-ignition region Rf in a plan view. In the embodiments shown in FIGS. 2A and 2B, three nozzle holes 4 (4a to 4c) exist in the near-ignition region Rn, and the specific near nozzle hole 42 is one nozzle hole 4b (nearest nozzle hole 42s) extending along the reference line Ba in the near-ignition region Rn. On the other hand, three nozzle holes 4 (4d to 4f) exist also in the far-ignition region Rf, and the specific far nozzle hole 43 is one nozzle hole 4e (farthest nozzle hole 43s) extending along the reference line Ba in the far-ignition region Rf. Further, the cross-sectional area Sb of the nozzle hole 4b, which is the specific near nozzle hole 42, is smaller than the cross-sectional area Se of the nozzle hole 4e, which is the specific far nozzle hole 43, and thus the cross-sectional area Sn of the specific near nozzle hole 42 is smaller than the cross-sectional area Sf of the specific far nozzle hole 43.

In the embodiment shown in FIG. 2A, the cross-sectional area Sn of the nearest nozzle hole 42s is smaller than the cross-sectional area S of each of the other nozzle holes 4 (five nozzle holes in FIG. 2A), and thereby the cross-sectional area Sn of the nearest nozzle hole 42s is smaller than the cross-sectional area Sf of the farthest nozzle hole 43s. In the embodiment shown in FIG. 2B, the cross-sectional area Sf of the farthest nozzle hole 43s is larger than the cross-sectional area S of each of the other nozzle holes 4 (five nozzle holes in FIG. 2B), and thereby the cross-sectional area Sn of the nearest nozzle hole 42s is smaller than the cross-sectional area Sf of the farthest nozzle hole 43s.

However, the present invention is not limited to the present embodiments. The specific near nozzle hole 42 may be one or more, a plurality of nozzle holes 4, and the specific far nozzle hole 43 may be one or more, a plurality of nozzle holes 4. In a case where the specific near nozzle hole 42 or the specific far nozzle hole 43 includes a plurality of nozzle holes 4, they may be arranged so that a nozzle hole 4 with a later arrival timing has a larger cross-sectional area S, in accordance with the timing of arrival of the combustion flame produced in the precombustion chamber 3r. Further, the nearest nozzle hole 42s may not be the specific near nozzle hole 42. Similarly, the farthest nozzle hole 43s may not be the specific far nozzle hole 43.

With the above configuration, in a plan view of the precombustion chamber 3r, the cross-sectional area Sn of the nozzle hole 4 (nearest nozzle hole 42s) closest to the ignition portion 51 is smaller than the cross-sectional area Se of the nozzle hole 4 (farthest nozzle hole 43s) farthest from the ignition portion 51. Thereby, in the precombustion chamber 3r, it is possible to adjust and equalize injection start timing of each of the nearest nozzle hole 42s which the combustion flame produced by ignition of an air-fuel mixture by the ignition device 5 reaches the earliest and the farthest nozzle hole 43s which the combustion flame reaches the latest, and it is possible to suppress the variation of injection start timing of torch jet injected to the main combustion chamber from each of the nozzle holes 4. Thereby, it is possible to efficiently suppress the variation of flame propagation in the main combustion chamber 2r.

Further, in some embodiments, as shown in FIG. 2A, the cross-sectional area Sn of the specific near nozzle hole 42 is smaller than an average of cross-sectional areas S of all of the plurality of nozzle holes 4. In the embodiment shown in FIG. 2A, the specific near nozzle hole 42 is the nearest nozzle hole 42s, and all of the other five nozzle holes 4 have the same cross-sectional area S corresponding to Sf. Further, the cross-sectional area Sn of the specific near nozzle hole 42 (nearest nozzle hole 42s) is smaller than the cross-sectional area S of each of the other five nozzle holes 4, and is smaller than an average of the cross-sectional areas S of the six nozzle holes 4.

With the above configuration, by making the cross-sectional area Sn of the specific near nozzle hole 42 smaller than the average, the cross-sectional area Sn of the specific near nozzle hole 42 is made smaller than the cross-sectional area Sf of the specific far nozzle hole 43.

In some embodiments, as shown in FIG. 2B, the cross-sectional area Sf of the specific far nozzle hole 43 is larger than an average of cross-sectional areas S of all of the plurality of nozzle holes 4. In the embodiment shown in FIG. 2B, the specific far nozzle hole 43 is the farthest nozzle hole 43s, and all of the other five nozzle holes 4 have the same cross-sectional area S. Further, the cross-sectional area Sf of the specific far nozzle hole 43 (farthest nozzle hole 43s) is larger than the cross-sectional area S of each of the other five nozzle holes 4, and is larger than an average of the cross-sectional areas S of the six nozzle holes 4.

With the above configuration, by making the cross-sectional area Sf of the specific far nozzle hole 43 larger than the average, the cross-sectional area Sn of the specific near nozzle hole 42 is made smaller than the cross-sectional area Sf of the specific far nozzle hole 43.

Second, embodiments relating to angle θ of depression of the nozzle hole 4 will be described with reference to FIG. 3. The angle θ of depression of the nozzle hole 4 is an angle between a line perpendicular to the main chamber central axis Cm and the central line Cp of the nozzle hole 4.

In some embodiments, as shown in FIG. 3, an angle θn of depression of the specific near nozzle hole 42 which is at least one nozzle hole 4 in the near-ignition region Rn is larger than an angle θf of depression of the specific far nozzle hole 43 which is at least one nozzle hole 4 in the far-ignition region Rf (θn>θf). Here, as the angle θ of depression of the nozzle hole 4 increases, the flame propagation distance of the combustion flame from the main-chamber-side opening end 41m of the nozzle hole 4 to the cylinder wall surface 13w increases, and it takes longer time for flame propagation to the cylinder wall surface 13w. Therefore, in the precombustion chamber 3r, by setting the angle θn of depression of the specific near nozzle hole 42 which the combustion flame produced by ignition of an air-fuel mixture by the ignition device 5 reaches earlier to be larger than the angle θf of depression of the specific far nozzle hole 43 which the combustion flame reaches later, it is possible to adjust and equalize the timing of arrival of the combustion flame to the cylinder wall surface 13w, and it is possible to suppress the variation of flame propagation in the main combustion chamber 2r Further, by suppressing the variation of flame propagation in the main combustion chamber 2r, it is possible to suppress knocking caused by delay of arrival of the combustion flame, and it is possible to improve the efficiency of the precombustion chamber gas engine.

More specifically, in some embodiments, the specific near nozzle hole 42 may be a nearest nozzle hole 42s which is a nozzle hole 4 closest to the ignition portion 51 in the near-ignition region Rn in a plan view; and the specific far nozzle hole 43 may be a farthest nozzle hole 43s which is a nozzle hole 4 farthest from the ignition portion 51 in the far-ignition region Rf in a plan view (see FIGS. 2A and 2B regarding nearest nozzle hole 42s and farthest nozzle hole 43s.

However, the present invention is not limited to the present embodiments. The specific near nozzle hole 42 may be one or more, a plurality of nozzle holes 4, and the specific far nozzle hole 43 may be one or more, a plurality of nozzle holes 4. In a case where the specific near nozzle hole 42 or the specific far nozzle hole 43 includes a plurality of nozzle holes 4, they may be arranged so that a nozzle hole 4 with an earlier arrival timing has a larger angle θ of depression, in accordance with the timing of arrival of the combustion flame produced in the precombustion chamber 3r. Further, the nearest nozzle hole 42s may not be the specific near nozzle hole 42. Similarly, the farthest nozzle hole 43s may not be the specific far nozzle hole 43.

With the above configuration, in a plan view of the precombustion chamber 3r, the angle θn of depression of the nozzle hole 4 (nearest nozzle hole 42s) closest to the ignition portion 51 is larger than the angle θf of depression of the nozzle hole 4 (farthest nozzle hole 43s) farthest from the ignition portion 51. Thereby, in the precombustion chamber 3r, it is possible to adjust and equalize the timing of arrival of the combustion flame to the cylinder wall surface 13w from each of the nearest nozzle hole 42s which the combustion flame produced by ignition of an air-fuel mixture by the ignition device 5 reaches the earliest and the farthest nozzle hole 43s which the combustion flame reaches the latest, and it is possible to efficiently suppress the variation of flame propagation in the main combustion chamber 2r.

Further, in some embodiments, the angle θn of depression of the specific near nozzle hole 42 is larger than an average of angles θ of depression of all of the plurality of nozzle holes 4. For instance, the specific near nozzle hole 42 may be the nearest nozzle hole 42s and the other nozzle holes 4 may have the same angle θ of depression so that the angle θn of depression of the specific near nozzle hole 42 (nearest nozzle hole 42s) is larger than the angle θ of depression of each of the other nozzle holes 4.

With the above configuration, by making the angle θn of depression of the specific near nozzle hole 42 larger than the average, the angle θn of depression of the specific near nozzle hole 42 is made larger than the angle θf of depression of the specific far nozzle hole 43.

In some embodiments, the angle θf of depression of the specific far nozzle hole 43 is smaller than an average of angles θ of depression of all of the plurality of nozzle holes 4. For instance, the specific far nozzle hole 43 may be the farthest nozzle hole 43s and the other nozzle holes 4 may have the same angle θ of depression so that the angle θf of depression of the specific far nozzle hole 43 (farthest nozzle hole 43s) is smaller than the angle θ of depression of each of the other nozzle holes 4.

With the above configuration, by making the angle θ of depression of the specific far nozzle hole 43 smaller than the average, the angle θn of depression of the specific near nozzle hole 42 is made larger than the angle θf of depression of the specific far nozzle hole 43.

The present invention is not limited to the embodiments described above, but includes modifications to the embodiments described above, and embodiments composed of combinations of those embodiments.

For instance, the embodiments relating to the cross-sectional area S of the nozzle hole 4 as shown in FIGS. 1 to 2B may be combined with the embodiments relating to the angle θ of depression of the nozzle hole 4 as shown in FIG. 3.

REFERENCE SIGNS LIST

1 Precombustion chamber gas engine
11 Cylinder liner
12 Cylinder head
13 Cylinder
13w Cylinder wall surface
14 Piston
15 Intake port
16 Exhaust port
17 Intake valve
18 Exhaust valve
19 Precombustion chamber cap
2 Main-chamber forming portion
2r Main combustion chamber
3 Precombustion-chamber forming portion
3r Precombustion chamber
31 Small-diameter-cylinder forming portion
31r Small-diameter cylinder chamber
33 Large-diameter-cylinder forming portion
33r Large-diameter cylinder chamber
33c Constant diameter cylinder portion
33d Enlarged diameter cylinder portion
4 Nozzle hole
41m Main-chamber-side opening end
41s Precombustion-chamber-side opening end
42 Specific near nozzle hole
42s Nearest nozzle hole
43 Specific far nozzle hole
43s Farthest nozzle hole
5 Ignition device
51 Ignition portion
6 Precombustion-chamber-gas supply device
61 Precombustion-chamber-fuel-gas supply valve
D Predetermined distance
Cm Main chamber central axis
Cs Precombustion chamber central axis
Cp Central line of nozzle hole
Rf Far-ignition region
Rn Near-ignition region
S Cross-sectional area
Ba Reference line
Br Borderline

The invention claimed is:
1. A precombustion chamber gas engine comprising:
a main-chamber forming portion forming a main combustion chamber;

a precombustion-chamber forming portion forming a precombustion chamber communicating with the main combustion chamber via a plurality of cylindrical nozzle holes for injecting a torch jet which ignites a lean premixed gas in the main combustion chamber; and an ignition device disposed in the precombustion chamber and having an ignition portion spaced from a main chamber central axis of the main combustion chamber at a predetermined distance, wherein, in a plan view, the precombustion chamber has a near-ignition region in which the ignition portion is disposed and a far-ignition region opposite to the near-ignition region, the near-ignition region and the far-ignition region being separated by a borderline passing through a precombustion chamber central axis of the precombustion chamber and perpendicular to a straight line passing through the precombustion chamber central axis and the ignition portion, wherein the plurality of cylindrical nozzle holes includes a specific near nozzle hole in the near ignition region and a specific far nozzle hole in the far-ignition region, and a cross-sectional area of the specific near nozzle hole is smaller than a cross-sectional area of the specific far nozzle hole, and wherein the specific near nozzle hole is a nearest nozzle hole closest to the ignition portion among the plurality of cylindrical nozzle holes in the near-ignition region in said plan view, wherein the specific far nozzle hole is a farthest nozzle hole farthest from the ignition portion among the plurality of cylindrical nozzle holes in the far-ignition region in said plan view, wherein the remaining nozzle holes of the plurality of cylindrical nozzle holes, other than the specific near nozzle hole and the specific far nozzle hole, are intermediate nozzle holes disposed between the specific near nozzle hole and the specific far nozzle hole, and wherein a cross-sectional area of each of the intermediate nozzle holes is the same as the cross-sectional area of the specific near nozzle hole.

2. The precombustion chamber gas engine according to claim 1,
wherein the main chamber central axis of the main combustion chamber coincides with the precombustion chamber central axis.

3. The precombustion chamber gas engine according to claim 2,
wherein the precombustion chamber includes:
a cylindrical small-diameter-cylinder forming portion forming a small-diameter cylinder chamber having a predetermined inner diameter and connected to the plurality of cylindrical nozzle holes; and
a cylindrical large-diameter-cylinder forming portion forming a large-diameter cylinder chamber which has an inner diameter larger than that of the small-diameter cylinder chamber and in which the ignition portion of the ignition device is disposed, and
wherein the main chamber central axis coincides with the precombustion chamber central axis of the small-diameter cylinder chamber.

4. The precombustion chamber gas engine according to claim 3,
wherein the predetermined distance is larger than 10% of a maximum value of the inner diameter of the large-diameter cylinder chamber.

5. The precombustion chamber gas engine according to claim 1,
wherein, in said plan view, each of the plurality of cylindrical nozzle holes is formed so as to penetrate the precombustion-chamber forming portion linearly along a radial direction of the precombustion chamber central axis.

6. A precombustion chamber gas engine comprising:
a main-chamber forming portion forming a main combustion chamber;
a precombustion-chamber forming portion forming a precombustion chamber communicating with the main combustion chamber via a plurality of nozzle holes; and
an ignition device disposed in the precombustion chamber and having an ignition portion spaced from a main chamber central axis of the main combustion chamber at a predetermined distance,
wherein, in a plan view, the precombustion chamber has a near-ignition region in which the ignition portion is disposed and a far-ignition region opposite to the near-ignition region, the near-ignition region and the far-ignition region being separated by a borderline passing through a precombustion chamber central axis of the precombustion chamber and perpendicular to a straight line passing through the precombustion chamber central axis and the ignition portion,
wherein the plurality of nozzle holes includes a specific near nozzle hole in the near-ignition region and a specific far nozzle hole in the far-ignition region, and an angle of depression of the specific near nozzle hole is larger than an angle of depression of the specific far nozzle hole,
wherein the specific near nozzle hole is a nearest nozzle hole closest to the ignition portion among the plurality of nozzle holes in the near-ignition region in said plan view,
wherein the specific far nozzle hole is a farthest nozzle hole farthest from the ignition portion among the plurality of nozzle holes in the far-ignition region in said plan view,
wherein the remaining nozzle holes of the plurality of nozzle holes, other than the specific near nozzle hole and the specific far nozzle hole, are intermediate nozzle holes disposed between the specific near nozzle hole and the specific far nozzle hole, and
wherein an angle of depression of each of the intermediate nozzle holes is the same as the angle of depression of the specific near nozzle hole.

7. The precombustion chamber gas engine according to claim 6,
wherein the angle of depression of the specific near nozzle hole is larger than an average of angles of depression of all of the plurality of nozzle holes.

8. The precombustion chamber gas engine according to claim 6,
wherein the main chamber central axis of the main combustion chamber coincides with the precombustion chamber central axis.

9. The precombustion chamber gas engine according to claim 8,
wherein the precombustion chamber includes:
a cylindrical small-diameter-cylinder forming portion forming a small-diameter cylinder chamber having a predetermined inner diameter and connected to the plurality of nozzle holes; and a cylindrical large-diameter-cylinder forming portion forming a large-diameter cylinder chamber which has an inner diameter larger than that of the small-diameter cylinder chamber and in which the ignition portion of the ignition device is disposed, and wherein the main chamber central axis coincides with the precombustion chamber central axis of the small-diameter cylinder chamber.

10. The precombustion chamber gas engine according to claim 9, wherein the predetermined distance is larger than 10% of a maximum value of the inner diameter of the large-diameter cylinder chamber.

11. The precombustion chamber gas engine according to claim 6, wherein, in said plan view, each of the plurality of nozzle holes is formed so as to penetrate the precombustion-chamber forming portion linearly along a radial direction of the precombustion chamber central axis.

* * * * *